(12) United States Patent
Keller

(10) Patent No.: US 8,055,485 B2
(45) Date of Patent: Nov. 8, 2011

(54) PREDICTION OF TRENDS BASED ON HISTORY VALUES OF AN OBSERVABLE

(75) Inventor: Martin Keller, Vaihingen (DE)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 11/968,415

(22) Filed: Jan. 2, 2008

(65) Prior Publication Data

US 2008/0249752 A1    Oct. 9, 2008

(30) Foreign Application Priority Data

Jan. 29, 2007    (EP) .................................. 07101337

(51) Int. Cl.
*G06F 17/10*    (2006.01)
*G06F 17/12*    (2006.01)
(52) U.S. Cl. ................ 703/2; 703/21; 703/22; 702/182; 702/186
(58) Field of Classification Search ................ 703/2, 21, 703/22; 702/182, 186
See application file for complete search history.

(56) References Cited

U.S. PATENT DOCUMENTS

| | | | |
|---|---|---|---|
| 7,039,559 B2 * | 5/2006 | Froehlich et al. | ............. 702/187 |
| 7,147,500 B2 | 12/2006 | Tabata et al. | |
| 7,171,340 B2 | 1/2007 | Brocklebank | |
| 7,251,589 B1 | 7/2007 | Crowe et al. | |
| 7,606,684 B1 * | 10/2009 | Pierce | ............................... 703/2 |
| 2004/0181370 A1 * | 9/2004 | Froehlich et al. | ............. 702/187 |
| 2005/0125213 A1 * | 6/2005 | Chen et al. | ....................... 703/22 |
| 2006/0089559 A1 * | 4/2006 | Barbieri et al. | ............... 600/509 |

OTHER PUBLICATIONS

Venus Khim-Sen Liew, "On Autoregressive Order Selection Criteria", 2004, Faculty of Economics and Management, Universiti Putra Malaysia, pp. 1-14.*
Andrew C. Singer, et al., "Universal Linear Prediction by Model Order Weighting," 1999, IEEE, IEEE Transactions on Signal Processing, vol. 47. No. 10, pp. 2685-2699.*
Chung, Daesung, et al., "WCS V5.1 Performance Tuning," Redbooks, International Business Machines, ibm.com/redbooks, 234 pages, 2001.
CLECOM Software, "Autoregressive Modeling", http://www.clecom.co.uk/science/autosignal/help/Autoregressive_Model.com, 2007, pp. 1-4.
CLECOM Software, "AR Order Selection Criteria,", http://www.clecom.co.uk/science/autosignal/help/AR_Order_Selection_Criteria.com, 2007, pp. 1-2.
Elnaffar, Said, et al., "Characterizing Computer Systems' Workloads," Technical Report 2002-461, School of Computing, Queen's University, Kingston, Canada, 66 pages, 2002.

* cited by examiner

*Primary Examiner* — Jason Proctor
(74) *Attorney, Agent, or Firm* — Toler Law Group

(57) ABSTRACT

The proposed prediction of trends is based on history values of an observable. In more detail, a mathematical model is fitted on history values of an observable, said mathematical model having a ratio factor defined as a ratio between a number of history values used for calculation of a given observable value and a number of observable values modelled simultaneously. Information defining a minimum forecast horizon and a maximum forecast horizon together with respective ratio factor values is received, together with information defining a desired forecast horizon. A desired ratio factor value corresponding to the desired forecast horizon is determined based at least on said desired forecast horizon and said minimum and maximum forecast horizons together with said respective ratio factor values. The desired ratio factor value is used in fitting said mathematical model on said history values of said observable.

20 Claims, 5 Drawing Sheets

PREDICTION OF TRENDS BASED ON HISTORY VALUES OF AN OBSERVABLE

CROSS-REFERENCE TO RELATED APPLICATIONS

This application claims benefit under 35 U.S.C. 119 of European Patent Application No. 07101337.9 filed on Apr. 3, 2007, all of which is hereby incorporated by reference.

FIELD OF THE INVENTION

The present invention relates to prediction trends based on history values of an observable. In particular, but not exclusively, the present invention relates to predicting trends in the performance of a data processing system.

BACKGROUND OF THE INVENTION

In the following, prediction of trends is discussed in connection with predicting future performance of a database management system. The challenges and problems discussed here in connection with database management system apply also to other data processing systems. Some examples of such data processing systems are batch and interactive data processing systems, Client/Server systems, parallel systems and World Wide Web systems. Characterization of a computer systems workload is discussed, for example, by S. Elnaffar and P. Martin in Technical Report 2002-461 of the School of Computing, Queen's University, Kingston, Ontario, Canada.

Various kinds of database systems have been in use since the early days of electronic computing. In order to store and retrieve data from the database, a database management system (DBMS) is used. The database management system is a set of software programs that are linked to one or more database. As electronic commerce has gained prevalence, organizations have become increasingly dependent on database management systems for processing ever larger volumes and more critical nature of electronic data. A failure of these database management systems can potentially result in a huge loss of money. Moreover, loss of such data may lead to dissatisfaction of customers and depreciate the market value of the organization. Hence, it is critically important to ensure high reliability of such database management systems.

The challenge faced by the operators and system administrators of such database management systems is how to detect and diagnose performance problems with the database management system in a timely manner, before the problem reaches a critical stage and results in a system failure. Upon pre-detection of the future performance problems, the operator can be warned and a possible failure of the database management system can be averted.

The performance of the database management system depends on various operating parameters such as memory usage, CPU time, and caching. The operating parameters govern effective usage of the database management system. One approach to address the aforementioned problem is to convert historical data of the operating parameters into meaningful recommendations and warnings of the future performance of the database management system. For being able to predict the future performance of a database management system, there is need to predict the long-term trend of at least one of the key performance indicators of the database management system. Prediction of trends may be done by modelling the earlier performance of the data base management system. The mathematical model can then be used for making a prediction about the future performance of the database management system.

In other connections, analysis of time series using autoregressive models has been studied. An autoregressive model uses a number of earlier observation values for determining a current observation value. One example of an autoregressive model is a linear autoregressive model, where $$x_n = a_1 x_{n-1} + a_2 x_{n-2} + a_3 x_{n-3} + \ldots + a_{dW} x_{n-dW} + \varepsilon_1$$

$$x_{n-1} = a_1 x_{n-2} + a_2 x_{n-3} + a_3 x_{n-4} + \ldots + a_{dW} x_{n-dW-1} + \varepsilon_2$$

$$\vdots \quad \vdots \qquad \vdots$$

$$x_{n-dL+1} = \begin{array}{l} a_1 x_{n-dL} + a_2 x_{n-dL-1} + a_3 x_{n-dL-2} + \ldots + \\ a_{dW} x_{n-dW-dL} + \varepsilon_{dL} \end{array}$$

In this equation group, the number of equations is dL and the number of coefficients a is dW. For being able to determine the coefficient values $a_1$ to $a_{dW}$, one needs to process simultaneously a number of equations. By choosing a different number dL, the values of the coefficients $a_1$ to $a_{dW}$ typically change. There are various approaches for selecting the number of equations and/or the number of coefficients for autoregressive models for the stationary situation. As some examples, consider criteria like the "Akaike Information Criterion", "Hannan-Quinn Criterion" or "Minimum Description length".

Using an autoregressive model, which fits well the existing time series points, it is possible to predict future behaviour under the assumption that the situation remains stationary. Under the stationary constraint, the known criteria for selecting the number of coefficients and the number of equations also applies. However, in many data processing systems the workload changes and the configuration of the data processing systems may also change. The stationary assumption is thus not valid in many situations. Stationary optimisation methods, which use the existing time series data for checking the quality of the autoregressive model, typically do not work well when the situation to be predicted is non-stationary.

There is currently no method available for determining the number of coefficients and the number of equations for a mathematical model used for prediction of trends in a non-stationary situation. Using a fixed number of coefficients and equations is typically not a feasible solution, as the operator of a database management system (or other data processing system) typically wishes to have prediction of trends for different time horizons. Any fixed values that may be suitable for a shorter forecast horizon, may not work well for a longer forecast horizon.

There is thus need for determining details of mathematical model is used for predicting the long-term trends in data processing system under non-stationary conditions. Thereafter the determined mathematical model can be fitted to history values of at least one observable for obtaining a prediction of a trend in the data processing system. The present invention addresses such a need.

SUMMARY OF THE INVENTION

A first aspect of the present invention provides a computerized method for predicting trends based on history values of an observable. The method comprises fitting a mathematical model on history values of an observable. The mathematical model having a ratio factor defined as a ratio between a number of history values used for calculation of a given observable value and a number of observable values modelled simultaneously. The method includes receiving information defining a minimum forecast horizon and a maximum forecast horizon together with respective ratio factor values, and receiving information defining a desired forecast horizon. The method further includes determining a desired ratio factor value corresponding to the desired forecast horizon based at least on said desired forecast horizon and said minimum and maximum forecast horizons together with said respective ratio factor values.

Finally, the method includes using said desired ratio factor value in fitting said mathematical model on said history values of said observable.

A second aspect of the present invention provides a data processing system for predicting trends based on history values of an observable. The data processing system comprising a future prediction module for fitting a mathematical model on history values of an observable. The mathematical model having a ratio factor defined as a ratio between a number of history values used for calculation of a given observable value and a number of observable values modelled simultaneously. The data processing system also a storage module for storing information defining a minimum forecast horizon and a maximum forecast horizon together with respective ratio factor values, and an input module for receiving information defining a desired forecast horizon. Finally the data processing system includes a ratio factor module for determining a desired ratio factor value corresponding to the desired forecast horizon based at least on said desired forecast horizon and said minimum and maximum forecast horizons together with said respective ratio factor values. The future prediction model is arranged to use said desired ratio factor value in fitting said mathematical model on said history values of said observable.

A third aspect of the present invention provides a data processing system for predicting trends based on history values of an observable. The data processing system comprises means for fitting a mathematical model on history values of an observable. The mathematical model having a ratio factor defined as a ratio between a number of history values used for calculation of a given observable value and a number of observable values modelled simultaneously. The data processing system also includes means for storing information defining a minimum forecast horizon and a maximum forecast horizon together with respective ratio factor values, and means for receiving information defining a desired forecast horizon. The data processing system includes means for determining a desired ratio factor value corresponding to the desired forecast horizon based at least on said desired forecast horizon and said minimum and maximum forecast horizons together with said respective ratio factor values. The means for fitting said mathematical model is arranged to use said desired ratio factor value in said mathematical model.

A further aspect of the invention provides a computer program product.

BRIEF DESCRIPTION OF THE DRAWINGS

The above and other items, features and advantages of the invention will be better understood by reading the following more particular description of the invention in conjunction with the accompanying drawings, wherein.

DETAILED DESCRIPTION OF THE EMBODIMENTS OF THE INVENTION

The present invention relates generally to predicting trends in the performance of a data processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In the following description, the linear autoregressive model is discussed in detail as an example. The principles of the invention, however, apply also to other autoregressive models. The invention is not limited to be used in connection with the linear autoregressive model only.

Similarly, a database management system is below often used as an example of a data processing system, where prediction of trends takes place.

Figure 1:
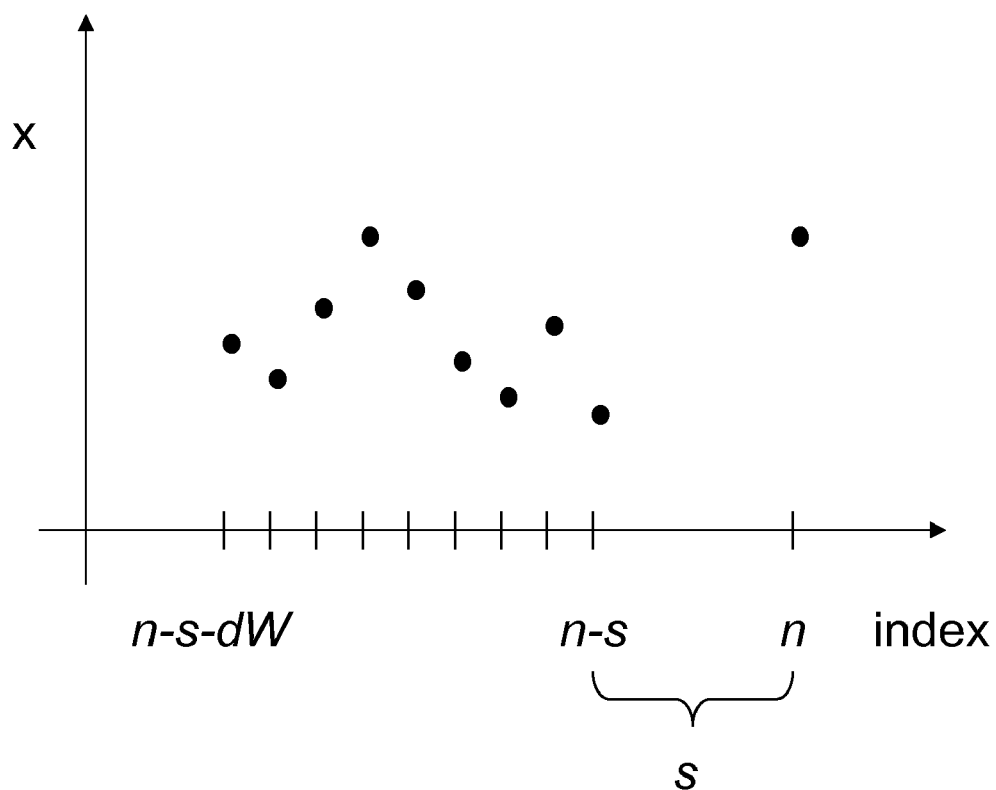
FIG. 1 illustrates the concept of the forecast horizon s.

Autoregressive models can be used for long-term trend prediction. For this purpose, the autoregressive model is typically modified to incorporate a forecast horizon s. FIG. 1 illustrates the concept of the forecast horizon. The linear autoregressive model for long-term trend prediction is as follows:

$$x_n = a_1 x_{n-s-1} + a_2 x_{n-s-2} + a_3 x_{n-s-3} + \ldots + a_{dW} x_{n-s-dW} + \varepsilon_1$$

$$x_{n-1} = a_1 x_{n-s-2} + a_2 x_{n-s-3} + a_3 x_{n-s-4} + \ldots + a_{dW} x_{n-s-dW-1} + \varepsilon_2$$

$$\vdots \qquad \vdots \qquad \qquad \vdots$$

$$x_{n-dL+1} = \begin{matrix} a_1 x_{n-s-dL} + a_2 x_{n-s-dL-1} + a_3 x_{n-s-dL-2} + \ldots + \\ a_{dW} x_{n-s-dW-dL} + \varepsilon_{dL} \end{matrix}$$

The number of observable values $x_i$ needed in the above design matrix is $dW+dL-1$. Typically the total number of collected values for an observable x is denoted with L. It is clear that the number of values $x_i$ needed in the above design matrix cannot exceed the total number of values. In other words: $dW+dL-1 \leq L$. If desired, it is possible to use a smaller number of observable values, e.g. 0.8 L, in determining the coefficients. One reason for using a smaller number of observable values is that the operator of the database management system wishes to discard older performance information from the prediction.

Typically s, dW, and dL are expressed as index differences or, in other words, number of measurement points. It is, however, clear to a skilled person that it is possible to express the value of the forecast horizon s as an index difference or as a time difference. The following description uses index differences.

Our studies show that non-stationary data require that the relative width dW/s for a single prediction point decreases when the forecast horizon s increases. In other words, $$\frac{dW(s')}{s'} \leq \frac{dW(s)}{s}, \text{ when } s' \geq s.$$

When a relatively smaller dW is used for larger forecast horizon values, this results in a destabilization of the forecasted values. The measured data become less stationary the more the forecast horizon s is enlarged.

To compensate the lack of stability in the forecasted values, there is need to enlarge the length dL to stabilize the forecast in terms of the long term trend. In the following, the ratio dL/dW is called a ratio factor rf. This ratio factor describes the shape of the design matrix. Increasing dL is equivalent to increasing the ratio factor rf, because dL=rf*dW.

Figure 2:
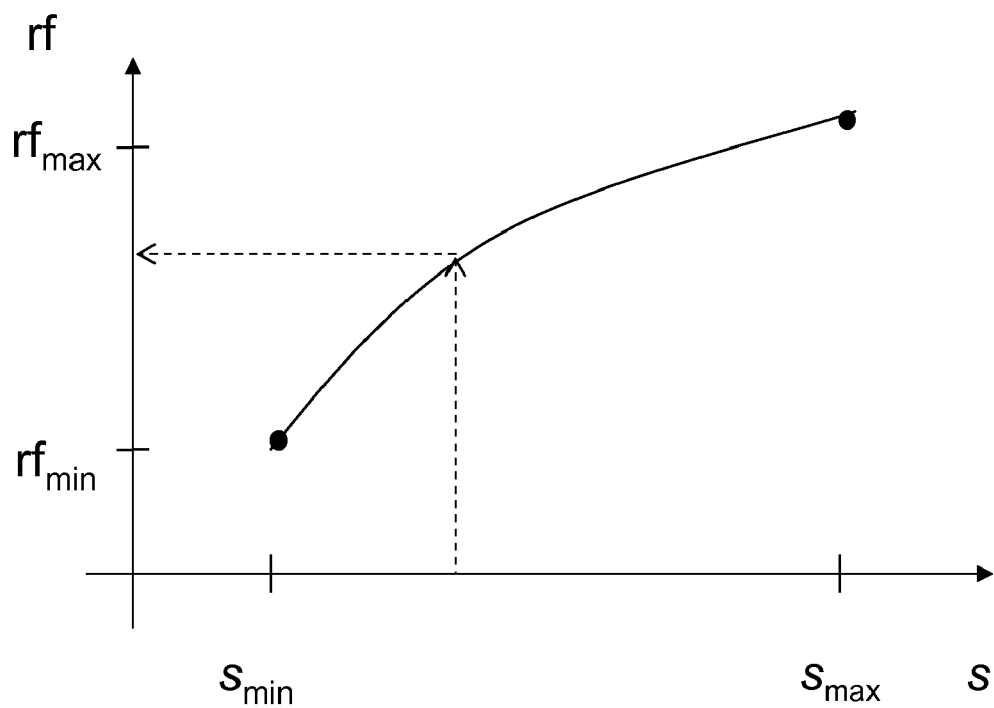
FIG. 2 shows, as an example, a relation between the forecast horizon s and the ratio factor rf.

Summarizing the findings, we have the following rule: for non-stationary data the ratio factor rf has to be equal/increasing when the forecast horizon s increases. Preferably, the ratio factor rf increases when the forecast horizon s increases. FIG. 2 shows, as an example, the relation between the forecast horizon s and the ratio factor rf.

For enabling an operator of a database management system to predict long-term trends for various forecast horizons, it is possible beforehand to determine minimum and maximum forecast horizons $s_{min}$ and $s_{max}$ and respective values $rf_{min}$ and $rf_{max}$ for the ratio factor. When the operator then specifies the desired forecast horizon, the corresponding ratio factor value can be determined by interpolation using the $rf_{min}$ and $rf_{max}$ values.

When the ratio factor value corresponding to the specified forecast horizon is determined, it is possible to determine the dimensions dW, dL of the design matrix. The ratio factor rf=dL/dW is known and usually it makes sense to use all (or all feasible) history values of the observable dW+dL−1=L. One thus has a set of equations for determining dW and dL.

Typically there is a lower limit for dW. This lower limit $dW_{min}$ is related to the mathematical aspects of the autoregression model, and it is typically independent of the forecast horizon s. As an example, the value of $dW_{min}$ may be 20. There is also typically an upper limit for dW. This upper limit $dW_{max}$ is often dictated by the available computing resources. As an example, $dW_{max}$ may be 100. If needed, the further restrictions $dW_{min} \leq dW \leq dW_{max}$ can be posed when determining dW.

Further details of determining the values for dW and dL are discussed below, in connection with the "Ratio Model".

Figure 3:
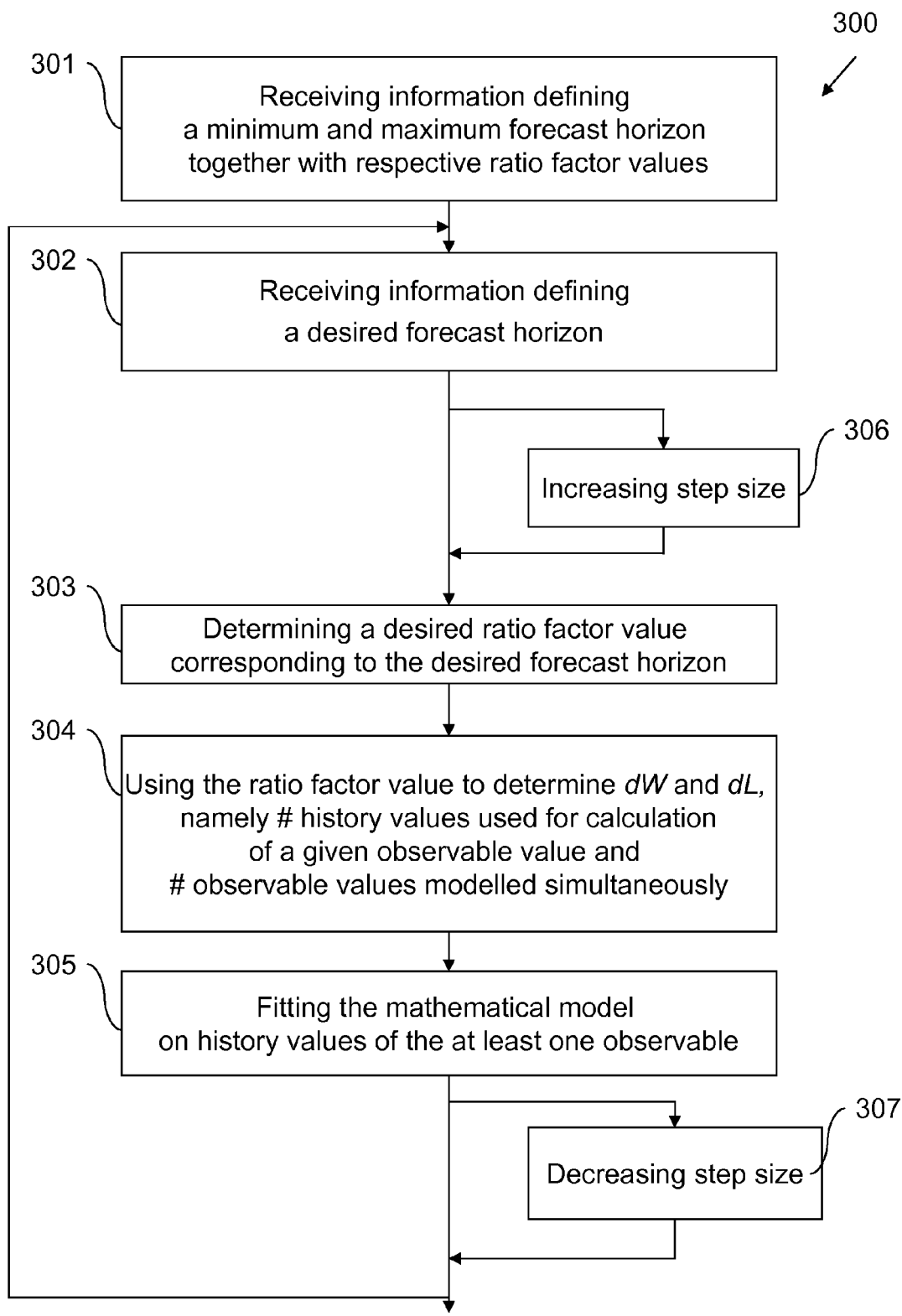
FIG. 3 shows, as an example, a flowchart of a method according to an embodiment of the present invention.

FIG. 3 shows, as an example, a flowchart of a method 300 in accordance with an embodiment of the present invention. The method 300 is a method for predicting trends based on history values of an observable. The method can be performed by a module of a database management system, for example by the future prediction module 436 shown in FIG. 4 or its respective sub-modules. In the following, reference is made to the module 436 as an example, but it is understood that the functionality may be provided by the sub-modules shown in FIG. 4 or by other sub-modules arranged to perform the relevant functionality.

In step 301, the module 436 receives information defining a minimum forecast horizon $s_{min}$ and a maximum forecast horizon $s_{min}$ together with respective ratio factor values $rf_{min}$ and $rf_{max}$. This information can be specified in the design phase, and it can be stored, for example, in a configuration file. In step 302, the module 436 receives information defining a desired forecast horizon $s_{desired}$ from the operator of the database management system. This information is usually received during run time. In step 303, the module 436 (or the sub-module 430) determines a desired ratio factor $rf_{desired}$ value corresponding to the desired forecast horizon $s_{desired}$. The desired ratio factor is determined based at least on said desired forecast horizon and said minimum and maximum forecast horizons together with the respective ratio factor values $rf_{min}$ and $rf_{max}$. In step 304, the module 436 uses the ratio factor value $rf_{desired}$ to determine a number (dW) of history values used for calculation of a given observable value and a number of (dL) observable values modelled simultaneously. In step 305, the module 436 fits the mathematical model (see module 432 in FIG. 4) on history values of the at least one observable. The steps 302 to 305 are repeated in response to, for example, the user requesting a new trend forecast. The trend forecast are typically based on all (or most recent) history information available. The update of the history information is not explicitly shown in FIG. 3, but data extraction module 428 may provide fresh values of observables, for example, periodically.

As discussed above, the ratio factor value corresponding to the minimum forecast horizon is typically smaller than the ratio factor value corresponding to the maximum forecast horizon. The desired ratio factor is typically obtained by interpolation, for example, in the module 436 or in the sub-module 430. The interpolation function can be a linear function, a step-function, or any other suitable (increasing) function. The mathematical model in the module 432 may be one of the following: autoregressive (AR) model, univariate autoregressive model, autoregression with moving average model (ARMA), autoregression with integrated moving average (ARIMA), and neural networks.

If the desired forecast horizon in step 302 exceeds the maximum forecast horizon mentioned in step 301, an alternative path including steps 306 and 307 may be used. Here the granularity of the data is made coarser to be able to predict longer into the future. If the trend prediction module is able to provide a forecast for $s_{max}$=100 points, this corresponds to a time horizon of 100 times the width of the original index difference (step size). By handling, for example, every second history value in the forecast, the step size in the mathematical model corresponds to a doubled time difference. The maximum forecast horizon, which is expressed as number of points, thus corresponds to a doubled time difference. However, instead of having forecast points separated by the original time step, the forecast points are separated by the doubled time step. By changing the width of the step size, it is thus possible adjust the length of the forecast horizon with the expense of the granularity of the forecast.

The history data is scaled by increasing the width of the time step in step 306. The width of the step size in the history values will be increased in step 306 such that the desired number of forecast length in time corresponds to a number of points that is smaller than or equal to the given maximum number $s_{max}$. The forecast is then carried out using the increased step size. After the forecast is done, the forecasted data are rescaled (width of the step size is decreased in step 307) to the original step width. It is clear that interpolation may be used in connection with the scaling (step 306) or rescaling (step 307).

The present invention may take the form of an entirely hardware embodiment, an entirely software embodiment or an embodiment containing both hardware and software elements. In accordance with an embodiment of the present invention, the invention is implemented in software, which includes, but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CDROM), compact disk—read/write (CD-R/W) and DVD.

Figure 4:
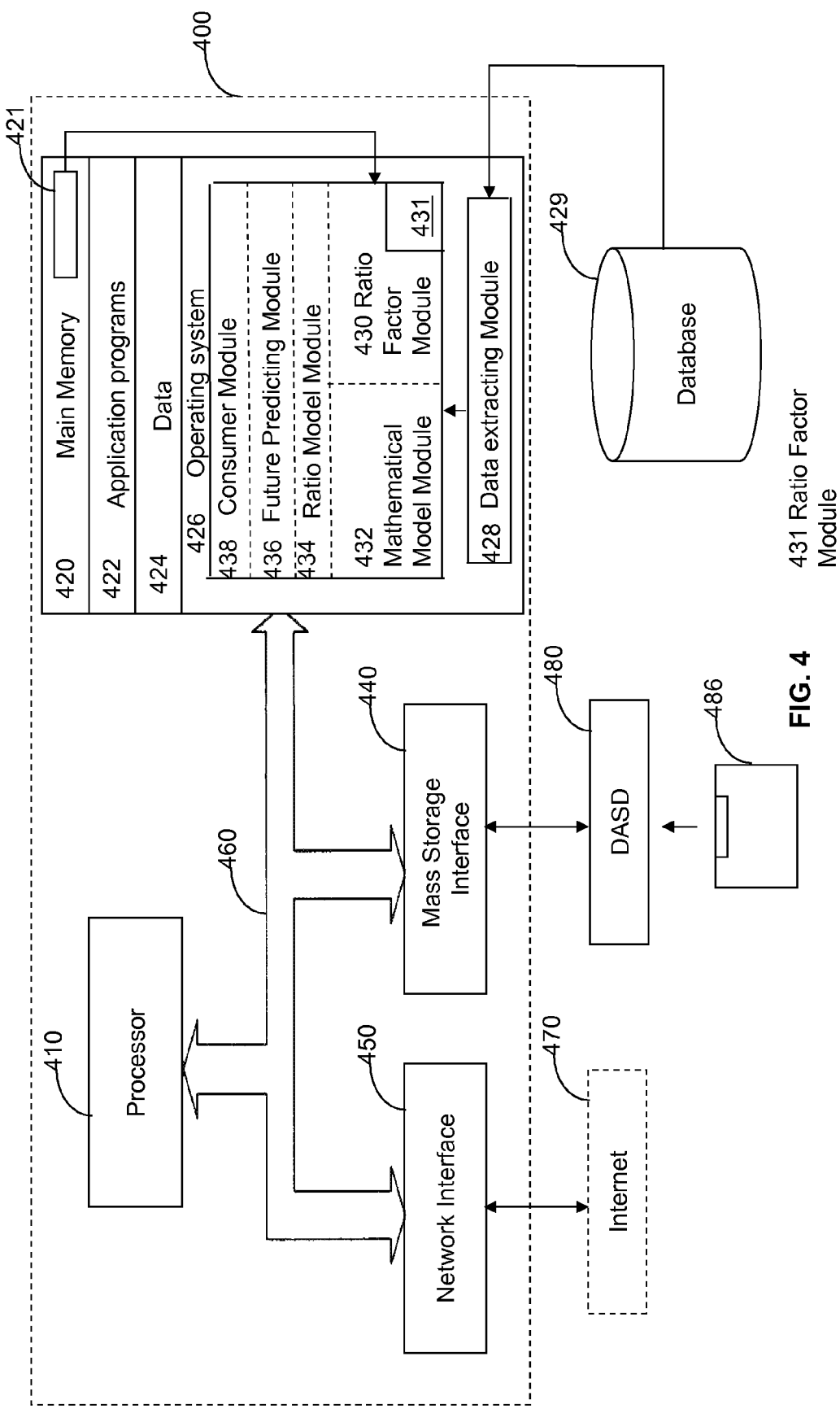
FIG. 4 shows, as an example of a data processing system where embodiments of the present invention are applicable, a database management system.

FIG. 4 shows, as an example of a data processing system 400 where embodiments of the present invention are applicable, a database management system. The data processing system 400 includes a processor 410, a main memory 420, a mass storage interface 440, and a network interface 450, all connected by a system bus 460. Those skilled in the art will appreciate that this system encompasses all types of computer systems: personal computers, midrange computers, mainframes, etc. Note that many additions, modifications, and deletions may be made to this computer system 400 within the scope of the invention. Examples of possible additions include: a display, a keyboard, a cache memory, and peripheral devices such as printers.

Processor 410 may be constructed from one or more microprocessors and/or integrated circuits. Processor 410 executes program instructions stored in main memory 420. Main memory 420 stores programs and data that computer system 400 may access. Main memory 420 includes one or more application programs 422, data 424, operating system 426, data extracting module 428 extracting the historical data from a database 429, a future prediction module 436 and a consumer module 438. The consumer module 438 may be, for example, a graphical monitoring tool showing the results of the future prediction module 436. As a further example, the consumer module 438 may be an alert module, which compares the prediction to predefined criteria and issues alerts accordingly. The future prediction module 438 contains an optional ratio model module 434 (for details, see discussion below), a ratio factor module 430 and a mathematical model module 432. The ratio factor module 430 determines a suitable ratio factor based on the desired forecast horizon and predefined information, as discussed above. The ratio factor model 430 receives from the storage module 421 information defining a minimum forecast horizon ($s_{min}$) and a maximum forecast horizon ($s_{max}$) together with respective ratio factor values ($rf_{min}$, $rf_{max}$). The ratio factor model 430 also has an input module 431 for receiving information defining a desired forecast horizon. The mathematical model module 432 contains an implementation of the mathematical module used for the prediction. When computer system 400 starts, processor 410 initially executes the program instructions that make up operating system 426. Operating system 426 manages the resources of computer system 400 for example, processor 410, main memory 420, mass storage interface 440, network interface 450 and system bus 460.

Application programs 422 are executed by processor 410 under the control of operating system 426. Application programs 422 may be run with program data 424 as input. Application programs 422 may also output their results as program data 424 in main memory. In one embodiment of the present invention, computer system 400 includes data extracting module 428 to extract the historical data of at least on operating parameter from database 429. Computer system 400 also includes trend building module 430 to build a trend of the historical data for each of the operating parameters and a future predicting module 436 to predict future performance of a Database management system (DBMS). Further, computer system 400 includes consumer module 438 to process prediction information provided by the future predicting module 436. The consumer module 438 may, for example, warn an operator about the future performance of the DBMS based on the predicted future performance. The "modules" are software codes that may be a callable routine or embedded into another program, i.e., an operating system or application program. For example, although the modules are shown as a part of operating system 426 in accordance with one embodiment of the invention, it is equally within the scope of the present invention to provide a separate software application or utility that could also provide data extracting module 428, mathematical module 432, ratio factor module 430, optional ratio model module 434, future predicting module 436 and consumer module 438. In accordance with an embodiment of the present invention, the modules may be provided as independent modules. In accordance with another embodiment of the present invention, the modules may be clubbed together.

Mass storage interface 440 allows computer system 400 to retrieve and store data from auxiliary storage devices such as magnetic disks (hard disks, diskettes) and optical disks (CD-ROM). These mass storage devices 480 are commonly known as Direct Access Storage Devices (DASD), and act as a permanent store of information. One suitable type of DASD 480 is a floppy disk drive 480 that reads data from and writes data to a floppy diskette 486. The information from the DASD may be in many forms. Common forms are application programs and program data. Data retrieved through mass storage interface 440 is usually placed in main memory 420 where processor 410 may process it.

While main memory 420 and DASD 480 are typically separate storage devices, computer system 400 may use well known virtual addressing mechanisms that allow the programs of computer system 400 to run smoothly as if having access to a large, single storage entity, instead of access to multiple, smaller storage entities (e.g., main memory 420 and DASD device 480). Therefore, while certain elements are shown to reside in main memory 420, those skilled in the art will recognize that these are not necessarily all completely contained in main memory 420 at the same time. It should be noted that the term "memory" is used herein to generically refer to the entire virtual memory of computer system 400. In addition, an apparatus in accordance with the present invention may include any possible configuration of hardware and software that contains the elements of the invention, whether the apparatus is a single computer system or is comprised of multiple computer systems operating in sync with each other.

Network interface 450 allows computer system 400 to send and receive data to and from any network connected to computer system 400. This network may be a local area network (LAN), a wide area network (WAN), or more specifically, the Internet 470. Suitable methods of connecting to a network include known analog and/or digital techniques, as well as networking mechanisms that are being developed or may be developed in the future. Various different network protocols may be used to implement a network. These protocols are specialized computer programs that allow computers to communicate across a network. TCP/IP (Transmission Control Protocol/Internet Protocol), used to communicate across the Internet, is an example of a suitable network protocol.

System bus 460 allows data to be transferred among the various components of computer system 400. Although computer system 400 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 410, or may include I/O adapters to perform similar functions.

The present invention provides a method for determining a ratio factor for the prediction of the future performance of a database management system (DBMS) or other data processing system. On basis of early warnings generated as a result of prediction, the operator can take one or more corrective actions, to reduce the chances of a system failure. The performance of the DBMS depends on various operating parameters of the DBMS. The operating parameters may include memory usage, CPU time, transactions per time, file system fill grade, transaction log space used, CPU utilization, disk utilization, buffer pool hit ratio at database level, table space level, buffer pool level and caching. These operating parameters govern the effective usage of the DBMS during interaction of the operator. In accordance with an embodiment of the present invention, the prediction of the future performance of the DBMS is provided to the operator by predicting future values of the operating parameters.

As discussed above, trend analysis or time series techniques are applied to predict the future values of the operating parameters. The method of an embodiment of the present invention predicts the future value of the operating parameters on the basis of the trend of data points of historical data of the operating parameters. The data points of historical data are past values of the operating parameters.

In the following, a Ratio Model using a dynamic ratio factor is discussed. The intent is to provide a generalised approach which enables prediction models to handle different forecast horizons for non-stationary data. This approach is independent from the selected prediction model and can be issued to expand the capability of existing (univariate) prediction models.

As discussed above, the ratio factor rf=dL/dW and the ratio factor is a function of the forecast horizon: rf=rf(s). This may be generalised further by stating that there is a Ratio Model, which provides values for dL and dW, when given a forecast horizon s and a number of available history values L. In other words, RatioModel:(s,L)→(dW,dL)

The ratio factor rf may be determined by a function called ratioFactor(s,L). The ratioFactor function may be a function of any type (e.g. linear, exponential, ...) to increase/decrease the ratio factor rf used by the Ratio Model.

The RatioModel can be applied to any time series prediction method that uses a window technique. The length of the window is determined as dW and the number of windows being used is determined as dL. The interpretation of the values dW and dL depends on the specific prediction model. As discussed above, for the linear autoregressive model they define the size of the design matrix. For Artificial Neural Networks (ANN), there relevant parameters are the number of neurons (dW) in the different layers (input layer, hidden layer, output layer) and number of time series (dL) used for training the ANN model.

Iterative approaches may be used to find a solution for the RatioModel. In the following, there is one example of an iterative approach.

For instance, an iterative approach may be:

RatioModel(s,L):(Sample implementation 1)

a) Get ratio factor with (rf,K)=ratioFactor(s,L)

b) Set dWidth=s+K dLength=rf*dWidth c) RETURN (dWidth,dLength)

ratioFactor(s,L):

d) Select an initial value for K, where k is element of (1,2, ... )

e) calculate a ratio factor rf=ratioFactor(s+K)

f) IF (((rf+1)*(s+K)−1)>L) AND (K>0))

THEN K=K−1

GOTO STEP e)

g) RETRUN (rf,K)

ratioFactor(X):

h) Calculates the ratio factor rf=f(X), where f is any function type (constant,linear,polynomial, ... ) and X is the width of the design model.

i) RETURN rf

This sample implementation determines the optimum ratio for a design model in respect to the available history length L and the forecast horizon s and determines dW and dL of the design model according to this ratio. For instance, the method can be tailored such that the user specifies the elementary ratioFactor(X) function (see above) returning a ratio factor for a specific width of the design model.

As a further example of an autoregressive model that can be used in connection with the RatioModel or in connection with other embodiments of the present invention, consider the iterative univariate autoregressive model. An iterative univariate autoregressive model of order p is typically noted with AR(p), and it is as follows:

$$x_{n+1} = \sum_{i=1}^{p} f_i(x_{n-i+1}) + \varepsilon_{n+1}$$

where $x_n$ is the most current observation, $f_i(\ )$ are the prediction functions being used (these function are linear, polynomial or exponential) and p determines the number of previous time-series data (window size) being used to predict the next forecast.

Applying the RatioModel to this AR(p) model has the effect that the order p is now determined from the RatioModel as a side effect of the dynamic ratio factor determination. It is most notable that this new AR(dW(s,L)) model determines the width/order dW(s,L) and the used history dL(s,L) dynamically in respect to the given forecast horizon s and the available history length L. Please note that this order determination does not require a stationary assumption of the time-series data as the known automatic order selection criteria like the "Akaike Information Criterion".

The dynamic autoregressive model AR(dW(s,L)) using the RatioModel is written $$x_{n+1} = \sum_{i=1}^{dW(s,L)} f_i(x_{n-i+1}) + \varepsilon_{n+1}$$

where $x_n$ is the most current observation, $f_i(\ )$ are the prediction functions being used (these function are typically linear, polynomial or exponential), dW(s,L) determines how many previous time-series data (window size) are used to predict the next forecast, and dL(s,L) determines number of windows being used to determine the parameters of the prediction functions $f_i(\ )$.

The values for dW and dL are determined from the Ratio Model as mentioned above RatioModel(s,L)→(dW,dL). dW is element of [s, s+1, . . . ], and the ratio between dL and dW is determined with the ratio factor function rf=ratioFactor(s, L).

Non-linear prediction functions $f_i(\ )$ may require an adaptation of the used ratio factors. This can be done by using an adapted ratio factor rf' such that $$rf' = rf * nP$$

where rf is the original ratio factor for a linear model and nP denotes the number of independent parameters of the prediction functions $f_i(\ )$. For instance a polynomial prediction function of degree 3, requires at least three parameters then nP=3.

Figure 5A:
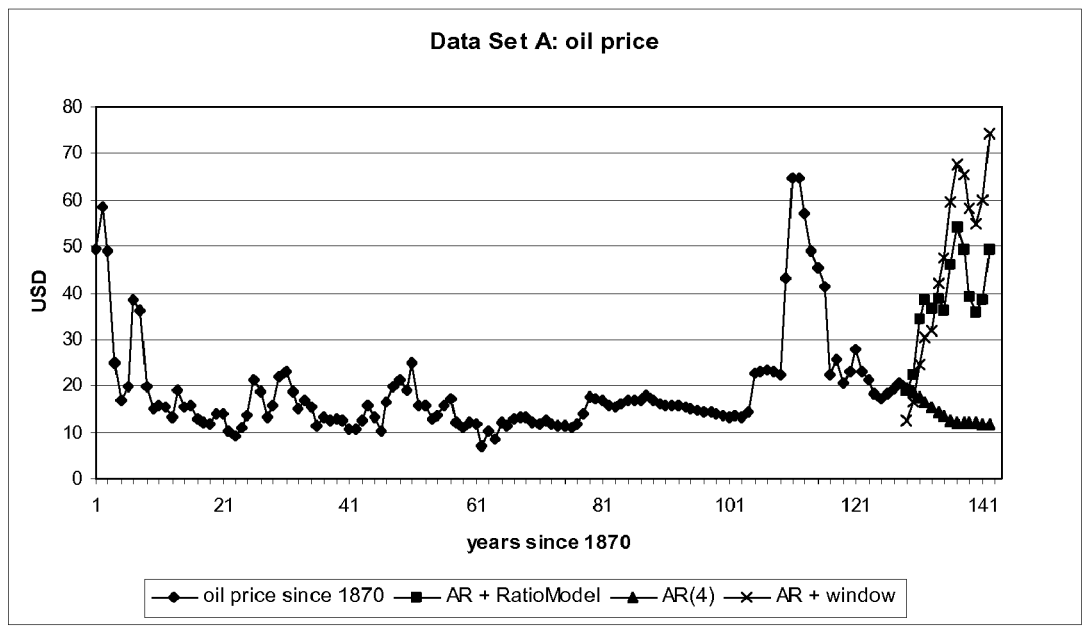
FIGS. 5a and 5b show, as an example, comparison of a forecast method in accordance with an embodiment of the invention with other forecast methods.
Figure 5B:
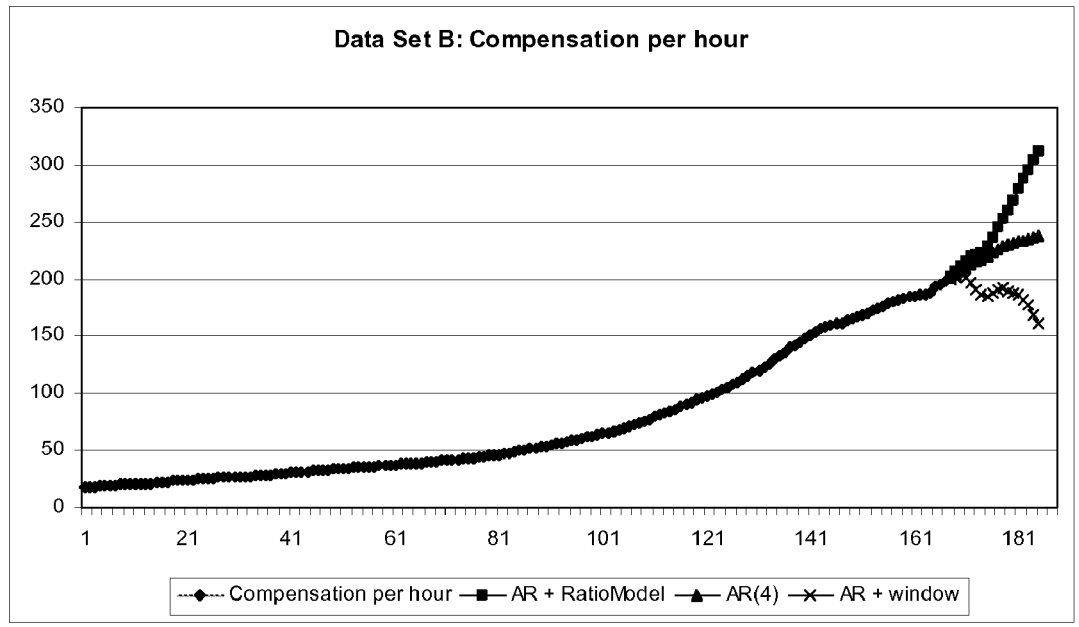
Figure 6:
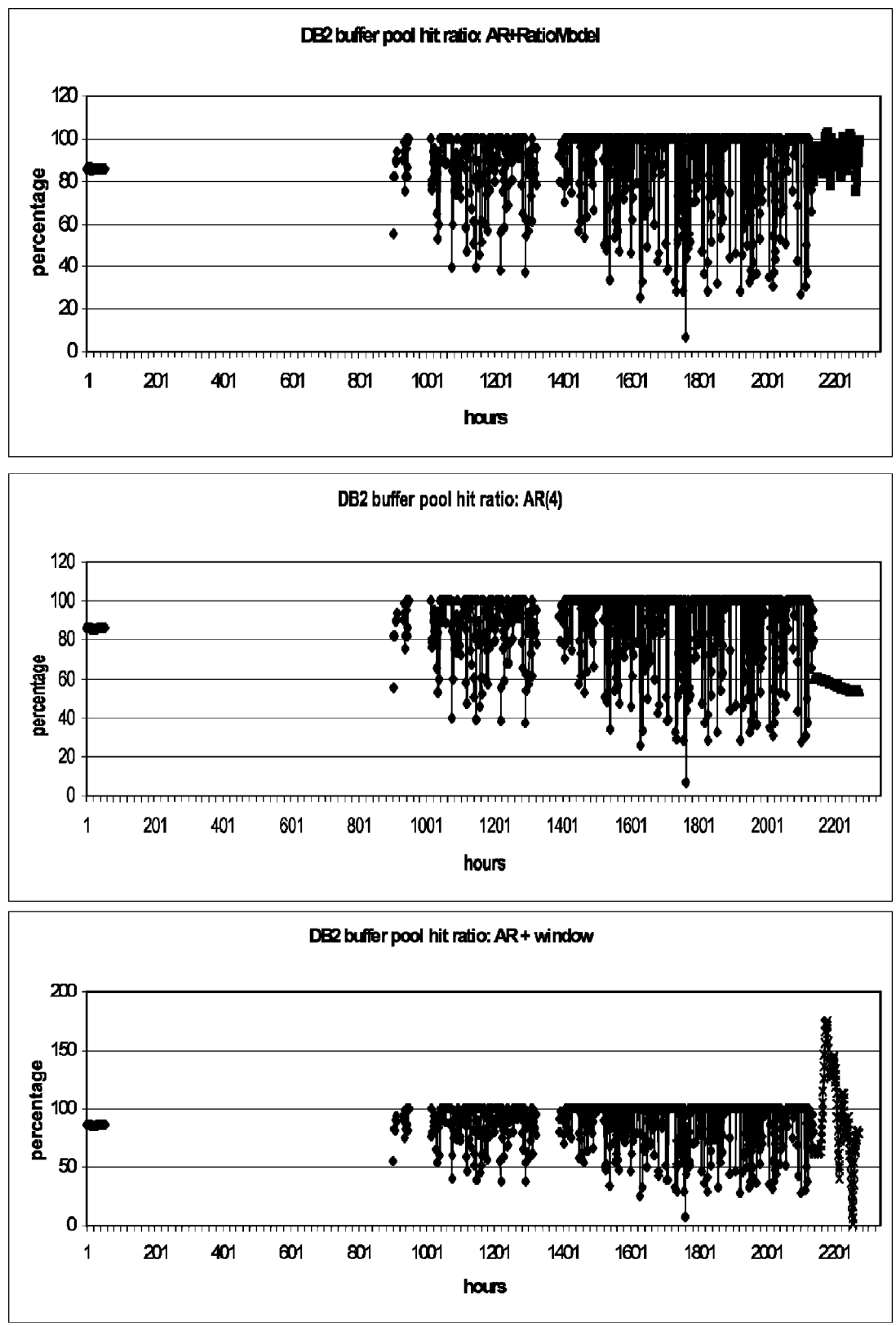
FIG. 6 show, as a further example, a second comparison of forecast methods.

FIGS. 5a, 5b and 6 show a comparative example of prediction of trends. The selected test data sets represent a wide application area such that different trend types, variances, macroeconomics and forecast horizons are reflected. The dataset A in FIG. 5a is the oil prices per barrel in USD, from 1870-1977.

The characteristics of this dataset A is a non-steady trend. The dataset B in FIG. 5b is called "Compensation per hour", and it is data for the "M-Competition"—a public time-series forecaster competition. This dataset can be obtained from the internal institute of forecasters. The characteristic of this dataset B is a steady trend, with a small spike at the end. The dataset C in FIG. 6 is DB2 performance warehousing data showing the "DB2 buffer pool hit ratio". The buffer pool hit ratio is a Key Performance Indicator of a DB2 database. The characteristic of this data is a steady trend with variances, and the data are interval based from [0.100%]. It is a larger dataset for long-term prediction.

The prediction approaches used in the comparison employ different autoregressive techniques. In the first approach, the ratio factor is determined in accordance with the invention for an autoregressive linear model. This first approach is called in the FIGS. 5a, 5b and 6 "AR+RatioModel". The second approach is a univariate linear autoregressive model of fourth order AR(4). This second approach is not employing ideas of the present invention. The third approach is using an autoregressive linear model, similarly as the first approach. The difference is that in the third approach dL=6s and dW=2s. The ratio dL/dW thus has a predefined value, namely dL/dW=3.

FIG. 5a shows the forecasts for the dataset A "oil price". As can be seen, the AR(4) approach ignores the last spike of the oil price values completely. This is a clear weakness of the AR(4) approach. FIG. 5b shows the forecasts for the dataset B "Compensation per hours. As can be seen, the "AR+window" approach ignores the overall trend and overestimates the small spike at the end of this data. This is a weakness of the "AR+window" approach. FIG. 6 shows the forecasts for dataset C "DB2 buffer pool hit ratio". The "AR+RatioModel" approach (upmost panel in FIG. 6) shows a stable forecast. The AR(4) forecast (middle panel in FIG. 6) underestimates the variances of the data. The AR+window approach (lowest panel in FIG. 6) shows on overestimation of the variance. Please note, this type of data is interval based [0.100%] and this limitation is unknown to the forecasting methods. Therefore the forecast may produce results that are out of the [0 . . . 100%] range.

The "AR+RatioModel" approach in accordance with the invention shows a stable forecast for these data samples with their different trends, variances and forecasting lengths. The reason for this is the dynamic ratio factor determination. The determined ratio factor for the data sets A and B is 4 and for data set C the ratio factor is 9.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In the appended claims a computerized method refers to a method whose steps are performed by a computing system containing a suitable combination of one or more processors, memory means and storage means.

While the foregoing has been with reference to particular embodiments of the invention, it will be appreciated by those skilled in the art that changes in these embodiments may be made without departing from the principles and spirit of the invention, the scope of which is defined by the appended claims.

Although the present invention has been described in accordance with the embodiments shown, one of ordinary skill in the art will readily recognize that there could be variations to the embodiments and those variations would be within the spirit and scope of the present invention. For example, although the splice is preferably made of a conductive material such as aluminum, it could be made utilizing a non-conductive material which has a conductive capability added to its surface and its use would be within the spirit and scope of the present invention. Accordingly, many modifications may be made by one of ordinary skill in the art without departing from the spirit and scope of the appended claims.

What is claimed:

1. A method comprising:
fitting, by a processor, a mathematical model on history values of an observable, the mathematical model having a ratio factor defined as a ratio between a number of history values used for calculation of a given observable value and a number of observable values modelled simultaneously;
receiving information defining a minimum forecast horizon and a maximum forecast horizon and information defining a minimum ratio factor value and a maximum ratio factor value;
receiving information defining a desired forecast horizon;
determining a desired ratio factor value corresponding to the desired forecast horizon based at least on the desired forecast horizon, the minimum forecast horizon, the maximum forecast horizon, the minimum ratio factor value, and the maximum ratio factor value; and
using the desired ratio factor value in fitting the mathematical model on the history values of the observable.

2. The method of claim 1, wherein a first desired ratio factor value corresponding to the minimum forecast horizon is smaller than a second desired ratio factor value corresponding to the maximum forecast horizon.

3. The method of claim 1, wherein the desired ratio factor value is determined by interpolation, wherein the interpolation is based on the desired forecast horizon, the minimum forecast horizon, the maximum forecast horizon, the minimum ratio factor value, and the maximum ratio factor value.

4. The method of claim 1, wherein the mathematical model is one of the following: autoregressive model, univariate autoregressive model, autoregression with moving average model, autoregression with integrated moving average, and neural networks.

5. The method of claim 1, wherein the number of history values includes all available history values.

6. The method of claim 1, wherein the number of history values comprises a set of most recent history values.

7. The method of claim 1, further comprising periodically updating the history values.

8. The method of claim 1, further comprising:
determining whether the desired forecast horizon exceeds the maximum forecast horizon; and
in response to determining that the desired forecast horizon exceeds the maximum forecast horizon, dynamically changing a step size in the mathematical model, wherein the change in step size in the mathematical model corresponds to a time difference.

9. The method of claim 8, wherein dynamically changing the step size includes fitting the mathematical model on a first set of history values and omitting a second set of history values from the mathematical model.

10. The method of claim 1, further comprising:
scaling the history values from a first step size to a second step size to produce scaled history values, wherein the first step size and the second step size are associated with the mathematical model;
using the desired ratio factor value in fitting the mathematical model on the scaled history values of the observable to produce forecast data; and
scaling the forecast data to the first step size.

11. A data processing system comprising:
a processor;
a future prediction module, executable by the processor, for fitting a mathematical model on history values of an observable, the mathematical model having a ratio factor defined as a ratio between a number of history values used for calculation of a given observable value and a number of observable values modelled simultaneously;
a storage module, executable by the processor, for storing information defining a minimum forecast horizon and a maximum forecast horizon and for storing information defining a minimum ratio factor value and a maximum ratio factor value;
an input module, executable by the processor, for receiving information defining a desired forecast horizon; and
a ratio factor module, executable by the processor, for determining a desired ratio factor value corresponding to the desired forecast horizon based at least on the desired forecast horizon, the minimum forecast horizon, the maximum forecast horizon, the minimum ratio factor value, and the maximum ratio factor value,
wherein the future prediction module is arranged to use the desired ratio factor value in fitting the mathematical model on the history values of the observable.

12. The data processing system of claim 11, wherein the observable is a key performance indicator of a database management system.

13. A data processing system comprising:
means for fitting a mathematical model on history values of an observable, the mathematical model having a ratio factor defined as a ratio between a number of history values used for calculation of a given observable value and a number of observable values modelled simultaneously;
means for storing information defining a minimum forecast horizon and a maximum forecast horizon and for storing information defining a minimum ratio factor value and a maximum ratio factor value;
means for receiving information defining a desired forecast horizon; and
means for determining a desired ratio factor value corresponding to the desired forecast horizon based at least on the desired forecast horizon, the minimum forecast horizon, the maximum forecast horizon, the minimum ratio factor value, and the maximum ratio factor value,
wherein the means for fitting the mathematical model is arranged to use the desired ratio factor value in the mathematical model, and wherein the means for determining the desired ratio factor value comprises at least one of circuitry configured to determine the desired ratio factor value and a processor configured to execute processor-executable instructions to determine the desired ratio factor value.

14. The data processing system of claim 13, wherein the observable is a key performance indicator of a database management system.

15. A computer program product stored on a non-transitory computer-usable storage medium having a computer-readable program, where the computer-readable program, when executed on a data processing system, causes the data processing system to:

fit a mathematical model on history values of an observable, the mathematical model having a ratio factor defined as a ratio between a number of history values used for calculation of a given observable value and a number of observable values modelled simultaneously;

receive information defining a minimum forecast horizon and a maximum forecast horizon and information defining a minimum ratio factor value and a maximum ratio factor value;

receive information defining a desired forecast horizon;

determine a desired ratio factor value corresponding to the desired forecast horizon based at least on the desired forecast horizon, the minimum forecast horizon, the maximum forecast horizon, the minimum ratio factor value, and the maximum ratio factor value; and use the desired ratio factor value in fitting the mathematical model on the history values of the observable.

16. The computer program product of claim 15, wherein a first desired ratio factor value corresponding to the minimum forecast horizon is smaller than a second desired ratio factor value corresponding to the maximum forecast horizon.

17. The computer program product of claim 16, wherein the mathematical model is one of the following: autoregressive model, univariate autoregressive model, autoregression with moving average model, autoregression with integrated moving average, and neural networks.

18. The computer program product of claim 15, wherein the desired ratio factor value is determined using interpolation.

19. The computer program product of claim 18, wherein the interpolation is based on the desired forecast horizon, the minimum forecast horizon, the maximum forecast horizon, the minimum ratio factor value, and the maximum ratio factor value.

20. The computer program product of claim 15, wherein the mathematical model is one of the following: autoregressive model, univariate autoregressive model, autoregression with moving average model, autoregression with integrated moving average, and neural networks.

* * * * *